(12) United States Patent
Reinhardt et al.

(10) Patent No.: US 12,151,462 B2
(45) Date of Patent: Nov. 26, 2024

(54) VISIBLE COMPONENT FOR A MOTOR VEHICLE

(71) Applicant: Bayerische Motoren Werke Aktiengesellschaft, Munich (DE)

(72) Inventors: Cornelia Reinhardt, Furth (DE); Mirko Schade, Landshut (DE); Bernhard Zeilmeier, Geisenhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/034,729

(22) PCT Filed: Aug. 31, 2021

(86) PCT No.: PCT/EP2021/073945
§ 371 (c)(1),
(2) Date: May 1, 2023

(87) PCT Pub. No.: WO2022/089813
PCT Pub. Date: May 5, 2022

(65) Prior Publication Data
US 2023/0415451 A1 Dec. 28, 2023

(30) Foreign Application Priority Data
Nov. 2, 2020 (DE) ..................... 10 2020 128 724.0

(51) Int. Cl.
*B32B 5/26* (2006.01)
*B32B 3/08* (2006.01)
(Continued)

(52) U.S. Cl.
CPC ................ *B32B 5/26* (2013.01); *B32B 3/085* (2013.01); *B32B 5/02* (2013.01); *B32B 7/12* (2013.01);
(Continued)

(58) Field of Classification Search
CPC ........ B60Q 3/54; B60Q 1/2661; B60Q 1/503; B32B 5/26; B32B 5/262; B32B 5/263;
(Continued)

(56) References Cited

U.S. PATENT DOCUMENTS 11,919,276 B2 * 3/2024 Newcomb ......... B32B 17/10788
2015/0029743 A1 1/2015 Gneiting et al.
(Continued)

FOREIGN PATENT DOCUMENTS

CN 1492722 A 4/2004
CN 102369786 A 3/2012
(Continued)

OTHER PUBLICATIONS

Machine translation of Kohler et al., DE 102018212239 A1, published Jan. 23, 2020 (Year: 2020).*
(Continued)

*Primary Examiner* — William N Harris
(74) *Attorney, Agent, or Firm* — Crowell & Moring LLP

(57) ABSTRACT

A visible component for a motor vehicle includes a main body which is in the form of a fiber-reinforced plastic component with a multi-layer fiber reinforcement which is integrated into an at least substantially transparent plastic matrix. The fiber reinforcement is formed by an opaque visible layer or a visible layer in the form of a metalized glass fiber layer and by substantially transparent structural layers.

18 Claims, 6 Drawing Sheets

(51) Int. Cl.
  *B32B 5/02* (2006.01)
  *B32B 7/12* (2006.01)
  *B60Q 1/26* (2006.01)
  *B60Q 3/54* (2017.01)
(52) U.S. Cl.
  CPC ............ *B60Q 1/2661* (2013.01); *B60Q 3/54* (2017.02); *B32B 2250/20* (2013.01); *B32B 2255/02* (2013.01); *B32B 2260/023* (2013.01); *B32B 2260/046* (2013.01); *B32B 2262/101* (2013.01); *B32B 2307/402* (2013.01); *B32B 2307/412* (2013.01); *B32B 2605/003* (2013.01); *B32B 2605/08* (2013.01)
(58) Field of Classification Search
  CPC . B32B 5/265; B32B 2605/00; B32B 2605/08; B32B 2605/003
  See application file for complete search history.

(56) References Cited

U.S. PATENT DOCUMENTS

| | | | |
|---|---|---|---|
| 2017/0120810 | A1 | 5/2017 | Twork et al. |
| 2018/0162102 | A1* | 6/2018 | Stickler ................ B29C 70/885 |
| 2020/0139595 | A1* | 5/2020 | Kim ........................ B32B 5/02 |
| 2020/0247088 | A1 | 8/2020 | Murakami et al. |
| 2021/0284063 | A1* | 9/2021 | Wang ........................ F21V 9/40 |
| 2021/0300006 | A1* | 9/2021 | Piccin ...................... B32B 7/12 |
| 2022/0024377 | A1 | 1/2022 | Behrens et al. |

FOREIGN PATENT DOCUMENTS

| | | |
|---|---|---|
| CN | 108839410 A | 11/2018 |
| DE | 101 54 543 A1 | 5/2003 |
| DE | 10 2016 003 812 A1 | 9/2017 |
| DE | 10 2018 212 239 A1 | 1/2020 |
| DE | 10 2018 133 306 A1 | 6/2020 |
| EP | 2 817 199 B1 | 4/2016 |
| EP | 3 335 869 A1 | 6/2018 |
| JP | 2006-123915 A | 5/2006 |
| KR | 20050043569 A | 5/2005 |
| WO | WO 00/01523 A1 | 1/2000 |

OTHER PUBLICATIONS

International Search Report (PCT/ISA/210) issued in PCT Application No. PCT/EP2021/073696 dated Jan. 12, 2022 with English translation (four (4) pages).
German-language Written Opinion (PCT/ISA/237) issued in PCT Application No. PCT/EP2021/073696 dated Jan. 12, 2022 (five (5) pages).
German-language Search Report issued in German Application No. 10 2020 128 723.2 dated Jan. 14, 2021 with partial English translation (12 pages).
International Search Report (PCT/ISA/210) issued in PCT Application No. PCT/EP2021/073945 dated Jan. 4, 2022 with English translation (four (4) pages).
German-language Written Opinion (PCT/ISA/237) issued in PCT Application No. PCT/EP2021/073945 dated Jan. 4, 2022 (five (5) pages).
German-language Search Report issued in German Application No. 10 2020 128 724.0 dated May 28, 2021 with partial English translation (12 pages).
Chinese Office Action dated Sep. 11, 2024 with English translation (17 pages).

* cited by examiner

VISIBLE COMPONENT FOR A MOTOR VEHICLE

BACKGROUND AND SUMMARY OF THE INVENTION

The invention relates to a visible component for a motor vehicle and especially to a visible component that can be backlit.

Motor vehicles have functional lights, for example headlamps or indicators. For design-related reasons, it is desirable to be able to light not only these functional lights but also further visible components of a motor vehicle, i.e. to equip them with a lighting function. This is especially true of visible components in the interior, and likewise of components in the exterior, of a motor vehicle.

Known examples are injection-molded parts that are laser-structured and backlit by a light source, for example the pushbutton for key switches described in document DE 101 545 43 A1. A disadvantage is the high absorbance of the light as it passes through the component, which leads to a reduction in luminance on the visible side of the component. In order to achieve sufficient luminance, significant reductions in wall thickness and/or intense light sources are required. The former requires weakening of the component, and the latter requires a large amount of space and results in high power consumption. Moreover, laser structuring entails an additional manufacturing step in the production of the components.

Against this background, it is an object of the invention to specify a visible component for a motor vehicle which is improved with regard to the possibility of lighting or backlighting, and especially has high radiation intensity in the lit state. In a further aspect, the visible component is to be producible inexpensively.

The object is achieved by a visible component according to the claimed invention.

A visible component is specified, having a main body in the form of a fiber-reinforced plastic component with a multilayer fiber reinforcement incorporated into an at least largely transparent plastic matrix. According to embodiments of the invention, the fiber reinforcement is formed by largely transparent structure layers and a visible layer that takes the form either of an opaque fiber layer or of a metallized glass fiber layer.

The main body of the visible component essentially defines the outlines and the shape of the visible component; for example, the main body forms the complete visible surface of the component. The main body additionally preferably also defines the mechanical properties of the visible component, for example flexural strength or torsion resistance. The visible component may, as well as the main body, include further elements, for example securing devices or receptacles for securing devices.

The main body has a visible side which is at least partly visible in the installed state of the visible component. The fiber reinforcement has multiple fiber layers one on top of another, and that fiber layer closest to the visible side is referred to as visible layer or else as the uppermost fiber layer. If the visible component is viewed from its visible side, the visible layer is visible through the matrix material.

The fiber reinforcement also includes structure layers. The structure layers are likewise fiber layers. The structure layers essentially define the mechanical properties of the visible component. The visible layer may, but need not, contribute to the structural strength of the component. The structure layers are formed from a material which is at least largely transparent in combination with the matrix material. The expression "at least largely transparent" should be understood here to mean that the feature described as largely transparent is transparent to the predominant portion of light visible to man, and that the outlines of a non-transparent body beneath are clearly apparent when it is lit. The at least largely transparent fiber layers and the at least largely transparent polymer matrix may also be completely transparent.

In other words, the visible component has an at least largely transparent fiber composite body in which a single visible layer formed from opaque fibers or metallized glass fibers is additionally integrated as well as multiple largely transparent fiber layers. Expressed in another way, the fiber composite body preferably consists of a visible layer which is formed from opaque fibers or metallized glass fibers, and which is embedded into an at least largely transparent composite composed of structure layers and plastic matrix.

The effect achieved by this structure is as follows: the visible component looks like a conventional visible component under daylight (without backlighting). The opaque visible layer or metallized glass fiber layer reflects a majority of the light, as a result of which this visible layer is visible to the observer and is simultaneously hidden, in that the underlying structure is largely transparent. The opaque visible layer or metallized glass fiber layer cause the visible component to look like a conventional visible component in the unlit state. If the component, by contrast, is backlit, the largely transparent fiber composite structure beneath the visible layer has the effect that a majority of the light passes through the component, as a result of which the observer perceives it to be lit. For this purpose, only a relatively low light intensity is required, since the visible component absorbs only a small amount of incident light on account of its structure. Both configurations are thus based on the same idea, namely that of making a fiber composite body largely transparent, apart from the visible layer, and of choosing the visible layer such that it conceals the largely transparent structure beneath under daylight, but allows light to pass through when backlit.

What is meant by an "opaque fiber layer" is a fiber layer formed by opaque fibers. The fibers are thus non-transparent; nevertheless, light passes through the fiber layer via the fiber interspaces. The opaque visible layer may be formed, for example, from aramid fibers, metal fibers or carbon fibers, or combinations of these fibers. In one configuration the visible layer may be formed, for example, by a carbon fiber layer, as a result of which the visible component looks like a conventional component in a carbon look.

As an alternative to the opaque visible layer, it is possible to use a metallized glass fiber layer. Glass fibers as such are milky/cloudy and translucent. The metallization, which can be effected, for example, in the form of a vapor deposition, coats the glass fiber layer with a very thin metal layer. The thickness of the metal layer is preferably chosen such that the glass fiber looks like a metal fiber to an observer under incident light. It may be advantageous when the metal layer has a thickness in the range from 10 nm to 100 mm.

In a preferred configuration, the thickness of the metallization or vapor-deposited metal is simultaneously kept sufficiently thin that the metallized glass fiber is still translucent when it is backlit. This has the advantage that, in the case of illumination of the visible component from the reverse side of the component, the light also passes through the glass fibers to which metal has been applied by vapor deposition. While the structure of the visible layer in the lit component remains visible to the observer when an opaque visible layer is used, such a metallized glass fiber layer can make the structure of the visible layer largely or even completely disappear to the observer, and achieve an even more distinct and clearer light effect.

The metallization or vapor deposition can be conducted with various metals, for example with aluminum, silver, gold etc. The respective thicknesses of the metal layer are dependent upon factors including the metal and the method used. In order to achieve the above-described effect, it has been found to be particularly advantageous in one configuration when the metallized glass fiber layer is a glass fiber layer to which aluminum has been applied by vapor deposition, and the aluminum layer has a thickness in the range from 40 nm to 60 nm and especially in the range from 45 mm to 55 nm.

The visible layer may be formed, for example, by a weave, a scrim, a knit, a nonwoven or a braid. If the visible layer used is an opaque fiber layer, the light from the backlighting passes through the largely transparent main body and the fiber interspaces of the visible layer. In one configuration, it is advantageous when the visible layer is formed by a weave. Such visible layers have relatively large and uniformly distributed fiber interspaces that are filled with the matrix material and through which the light can pass. In this way, it is possible for a particularly large amount of light to pass through the component and to achieve a high light intensity at the visible surface.

The plastic matrix of the visible component is largely transparent. In principle, the plastic matrix may be a thermoset or thermoplastic matrix. For the production of visible components that must meet high mechanical demands, it may be advantageous when the plastic matrix is a thermoset plastic matrix.

The structure layers, in one configuration of the invention, preferably take the form of glass fiber layers. The individual layers of glass fibers may be directed fiber layers, for example a scrim, weave, braid or the like, or undirected fiber layers, for example a nonwoven. If glass fibers are infiltrated with a largely transparent matrix material, they will likewise become largely transparent.

The visible component, like conventional fiber composite components, can be produced by known methods suitable for an industrial scale, for example wet molding or resin transfer molding (RTM). It is also possible to use prepregs, which are then processed further in an autoclave, for example. In this case, there is no need either for additional manufacturing steps or for additional plant components, which means that production can be effected inexpensively.

The visible component may be backlit from its reverse side, facing away from the visible side. For this purpose, only a relatively low light intensity is needed since the visible component absorbs or reflects only a small amount of incident light on account of its above-described construction. The visible component may be backlit by way of a light source disposed on the reverse side of the visible component within the motor vehicle.

In one configuration, however, the visible component may also have a light source disposed on a side of the main body facing away from the visible layer. The light source is arranged and configured such that light emitted from the light source lights the main body in the direction of the visible layer. The light source may, for example, be secured on the main body. The light source may, for example, be an LED. In one configuration, particularly uniform lighting is achieved with a low space requirement in that the light source used is a two-dimensional light source, for example an electroluminescent film or the like.

In order to achieve multicolor lighting, the main body, in one configuration, may also include one or more color filter layer(s). The color filter layer(s) may be disposed on the main body on a side facing away from the visible layer. It is likewise possible for the color filter layer(s) to be disposed on the visible side of the main body. The color filter layers may, for example, cover the whole visible component or only parts. The color filter layers act like a color filter and allow only particular wavelengths of light to pass through. The color filter layers may be formed, for example, by transparent or translucent color layers, for example paint layers or stain layers.

Particularly flexible and inexpensive individualization of the visible component is possible in one configuration in that the color filter layer(s) is/are stuck to the main body as a sticker, preferably to the reverse side of the main body. The color filter layer(s) may, for example, be disposed on a film or take the form of a film which takes the form, for example, of a self-adhesive film or includes an adhesive layer.

The use of color filter layers enables use of a single-color, e.g. white, light source, and nevertheless lighting of the visible component in multiple different colors. It is possible to dispense with the use of RGB lights. The use of color filter layers is therefore a particularly inexpensive way of creating multicolor light effects in a component.

Alternatively or additionally, it is possible to provide an opaque masking layer which is preferably disposed on a side of the main body remote from the visible layer. This makes it possible to limit the lighting effect to particular regions of the visible component in a simple manner. The masking layer is preferably fully opaque to the light emitted by the light source. The masking layer may take the form, for example, of a paint or a coating. Alternatively, the masking layer may be stuck onto the main body in the form of a sticker.

The use of masking layers and/or color filter layers allows various light effects to be achieved, and, for example, brand emblems, inscriptions, design lines or any desired shapes to be displayed as the light effect.

The visible component may, for example, be an interior component of a motor vehicle, for example an interior trim part, an armrest, a seat shell or the like. The visible component may alternatively be an exterior component of a motor vehicle, for example a mirror cap, spoiler, motor vehicle hatch or the like.

Further advantages, features and details of the invention will be apparent from the description that follows, in which working examples of the invention are described individually with reference to the drawings. It is possible here that the features mentioned in the claims and in the description are essential to the invention, each individually or in any combination. Where the word "may" or "can" is used in this application, this means both the technical possibility and the actual technical implementation.

Working examples are elucidated hereinafter with reference to the appended drawings.

DETAILED DESCRIPTION OF THE DRAWINGS

Figure 1:
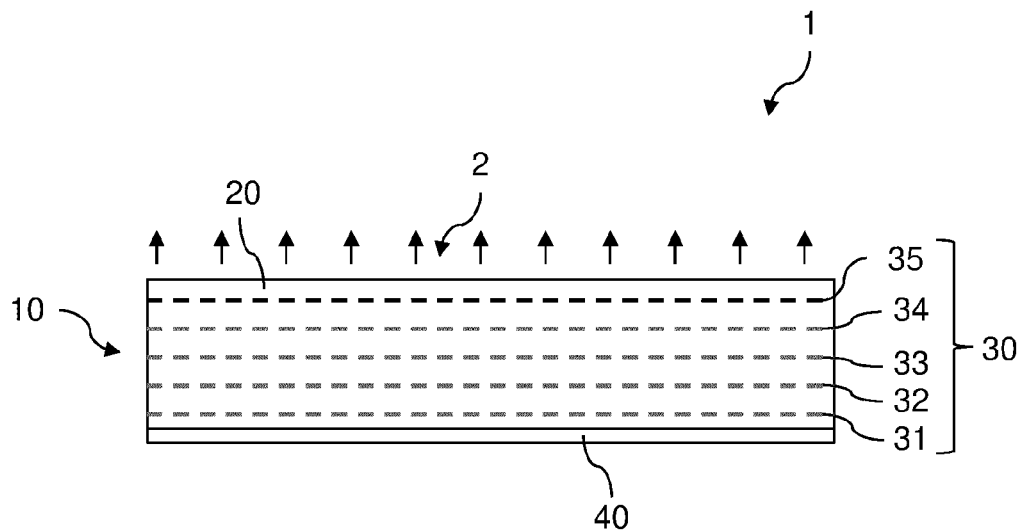
FIGS. 1 to 4 show section views of illustrative visible components.

FIG. 1 shows a first illustrative visible component 1. The visible component 1 has a main body 10 in the form of a fiber-reinforced plastic component. The main body 10 is formed by a plastic matrix 20, into which a fiber reinforcement 30 is embedded. The fiber reinforcement 30 is formed by multiple fiber layers that are layered one on top of another to form a stack. The fiber reinforcement 30 consists of multiple structure layers 31 to 34 (here by way of example four structure layers) and a visible layer 35. The visible layer 35, as the uppermost layer, faces the visible side 2 of the visible component 1. The visible layer 35 and the structure layers 31-34 may preferably take the form of directed fiber layers; the visible layer 35 preferably takes the form of a weave or scrim.

The plastic matrix 20 and the structure layers 31-34 are transparent or largely transparent. For example, a transparent plastic matrix and structure layers of glass fibers are used. If the glass fiber layers are infiltrated with the transparent plastic matrix, they will likewise become transparent or largely transparent. By contrast, the visible layer 35 takes the form of an opaque visible layer, preferably of an aramid fiber layer or a carbon fiber layer. The visible layer 35, viewed from the visible side of the component 1, is visible through the plastic matrix 20. In the unlit state, the visible component 1 looks like a conventional visible component in, for example, a carbon look.

Also disposed on the reverse side of the component 1, i.e. on the side remote from the visible side 2, is a light source 40. This may be secured, for example, on the main body with or without separation, or may, as shown in FIG. 1, be applied two-dimensionally to the main body 10. Light is emitted by the light source 40 in the direction of the main body 10. The light penetrates the main body 10 and exits therefrom on the visible side 2. On account of the use of a largely transparent plastic matrix 20 and a fiber reinforcement 30 having just a single opaque fiber layer 35, only a small proportion of the light emitted by the light source 40 is absorbed or reflected. The light exits from the component through the fiber interspaces of the opaque visible layer 35; the intensity of the light is reduced only slightly.

Figure 2:
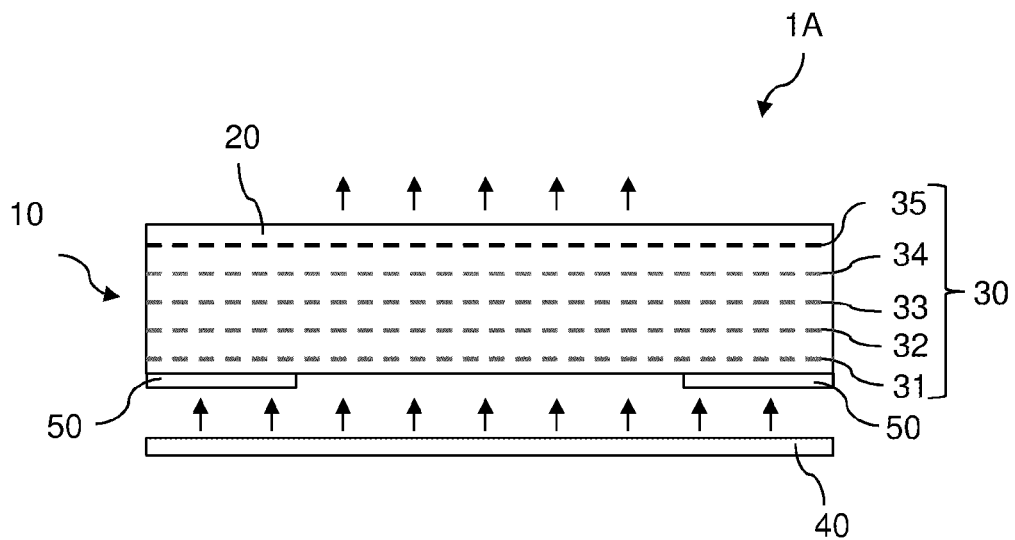
Figure 3:
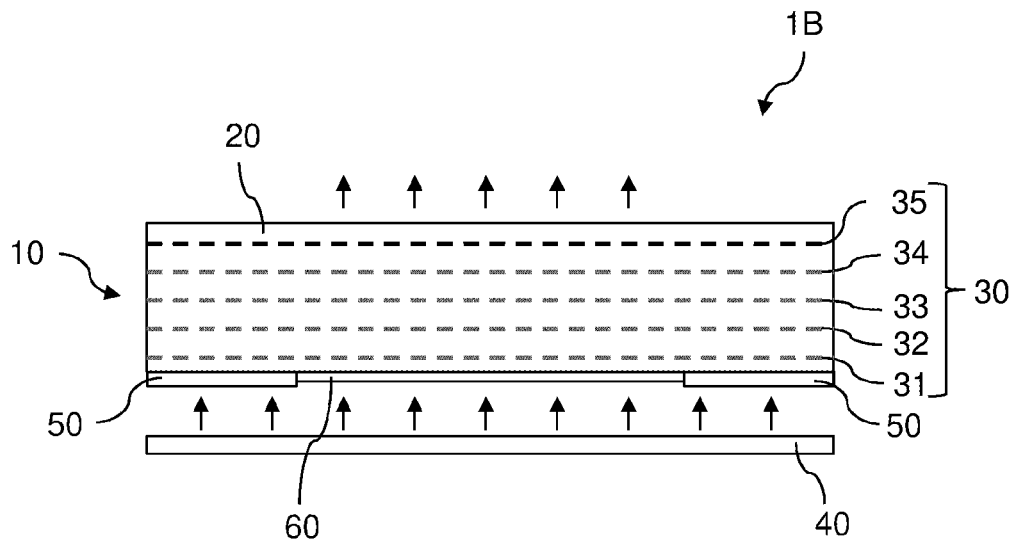
Figure 4:
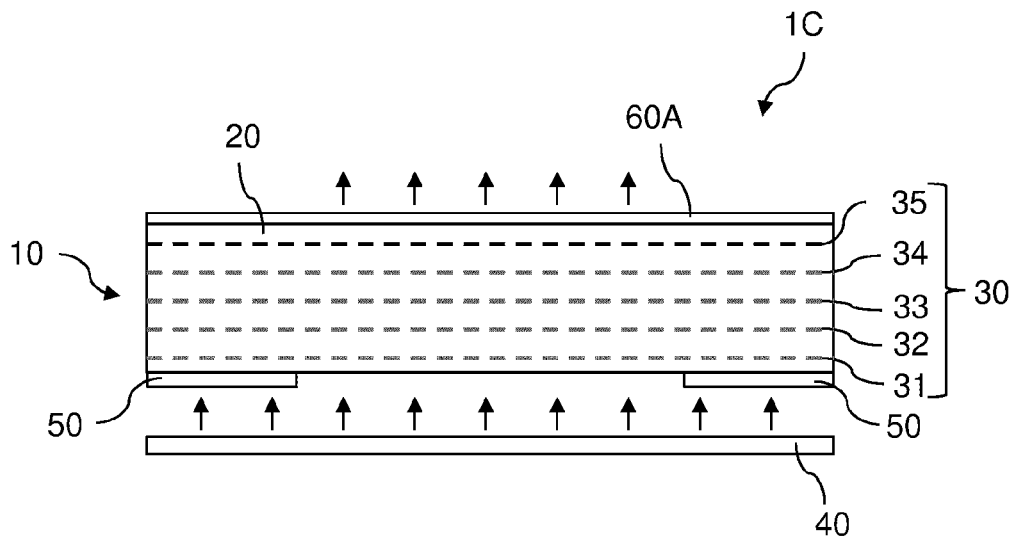

FIGS. 2, 3 and 4 show further alternative visible components 1A, 1B and 1C. If identical reference numerals are used, the features are identical and will not be described again.

The visible component 1A, as well as the above-described structure, also has an opaque masking layer 50. This is disposed on the reverse side of the main body 10 remote from the visible side 2, and partly covers it. In the masked regions, the masking layer 50 prevents passage of light from the light source 40, such that the visible component 1 remains unlit in these regions, even when the light source 40 is activated.

The visible component 1B differs from the visible component 1A in that a color filter layer 60 is disposed on the reverse side of the main body 10 in the unmasked region. This acts like a color filter, i.e. absorbs a portion of the light and transmits the remaining portion of the light (for example a particular color of light).

The masking layer 50 and/or the color filter layer 60 may be applied, for example, as paint layers or stains on the main body. Alternatively, the masking layer 50 and/or the color filter layer 60 may also take the form of stickers that are applied to the main body 10.

In the visible component 1C in FIG. 4, the color filter layer 60A is on the visible side 2 and is formed by a color paint layer or color stain, for example. This may be disposed directly on the main body 10, or there may be one or more additional layers, for example an adhesion promoter layer 10, disposed between the main body and the color filter layer 60A.

Figure 5:
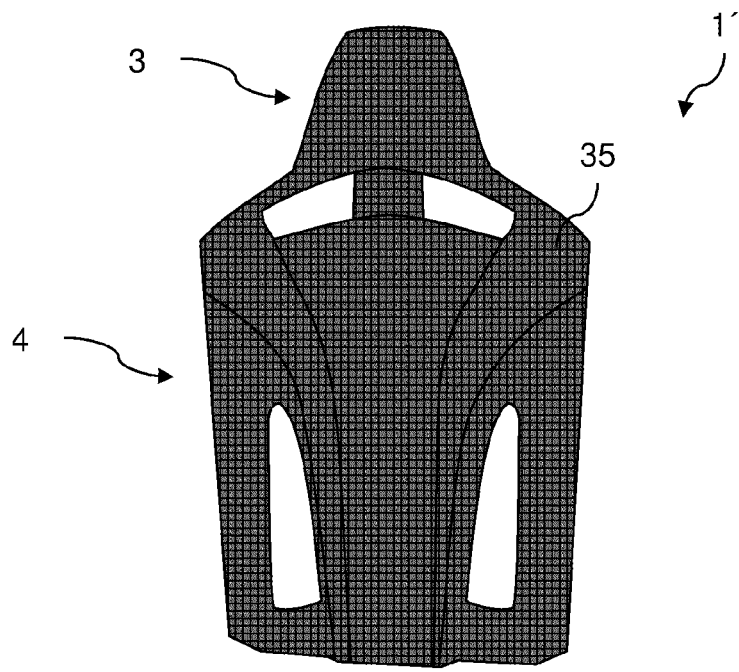
FIG. 5 shows a view of an illustrative unlit visible component.
Figure 6:
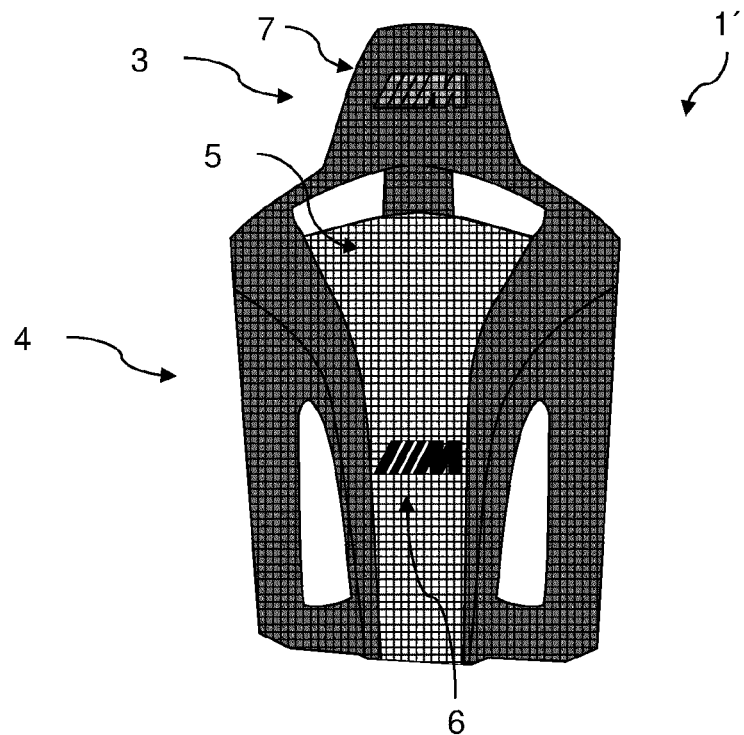
FIG. 6 shows the visible component from FIG. 5 in the lit state.
Figure 7:
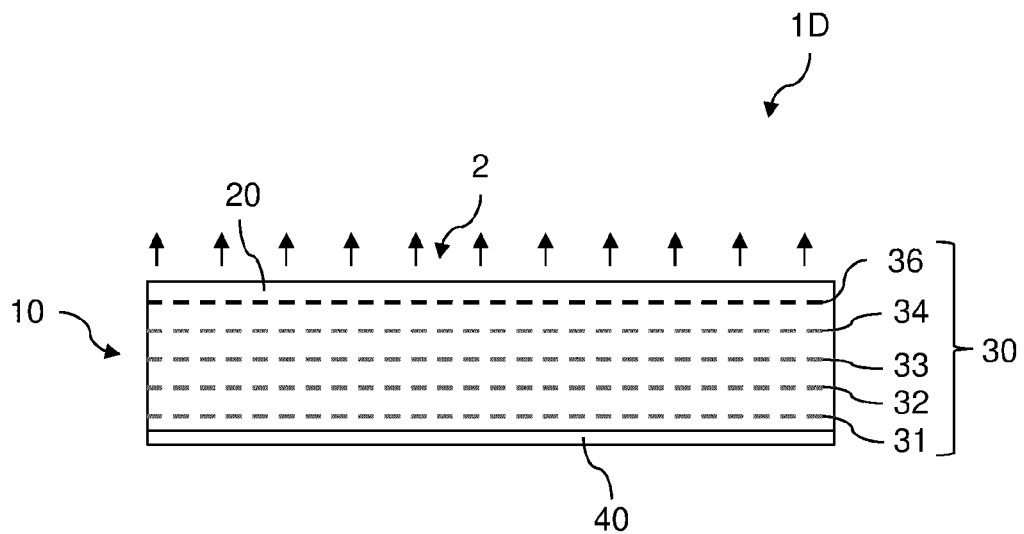
FIGS. 7 to 10 show section views of further illustrative visible components.

FIG. 5 and FIG. 6 show an illustrative visible component 1' in the form of a seat trim in the unlit state (FIG. 5) and the lit state (FIG. 6). The visible component 1' here has a structure as described for FIG. 3 in the region of the headrest 3, and a structure as described for FIG. 2 in the region of the backrest 4.

If the light source 40 is deactivated, the visible component 1' looks like a conventional component in a carbon look. The visible layer 35 can be seen through plastic matrix. With activated light source 40, the visible component 1' is lit from the inside. The backrest 4 is partly masked, such that only an inner region 5 is lit, while a brand label 6 in the inner region is likewise masked and remains unlit. In the region of the headrest 3, the masking leaves only a brand label 7 unmasked. The region of the brand label 7 is provided with three different-colored color filter layers (analogously to the color filter layer 60), as a result of which the brand label 7 is lit in strips of three different colors.

Figure 8:
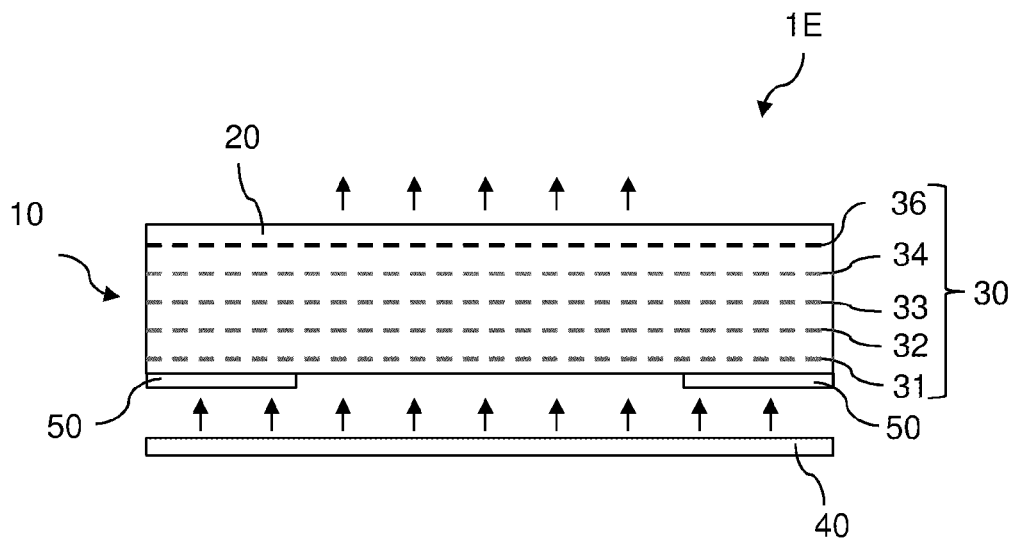
Figure 9:
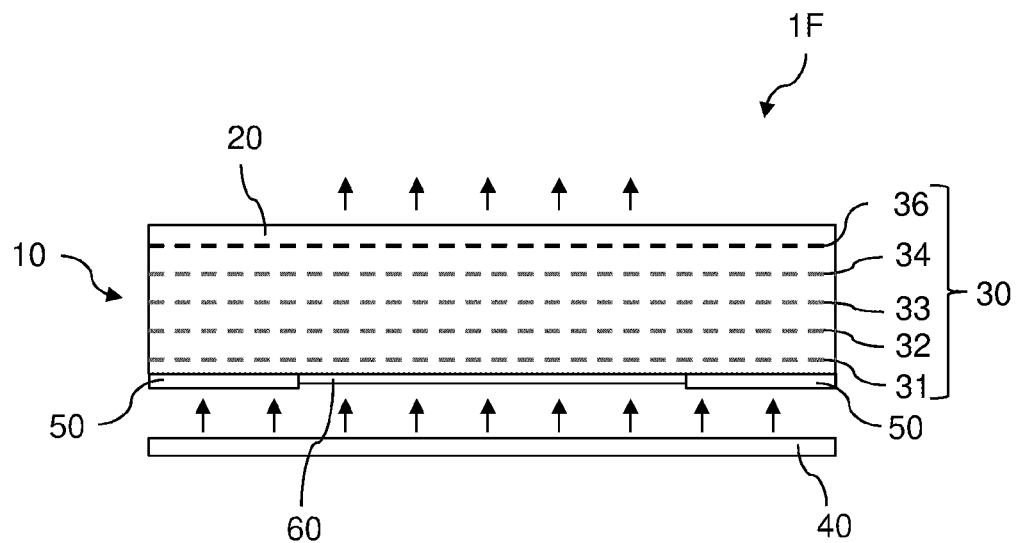
Figure 10:
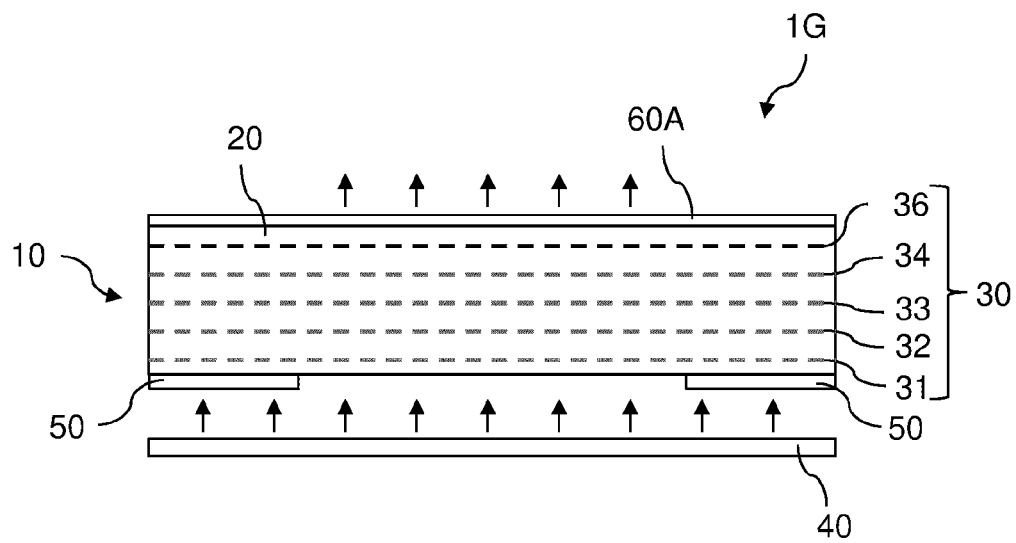
Figure 11:
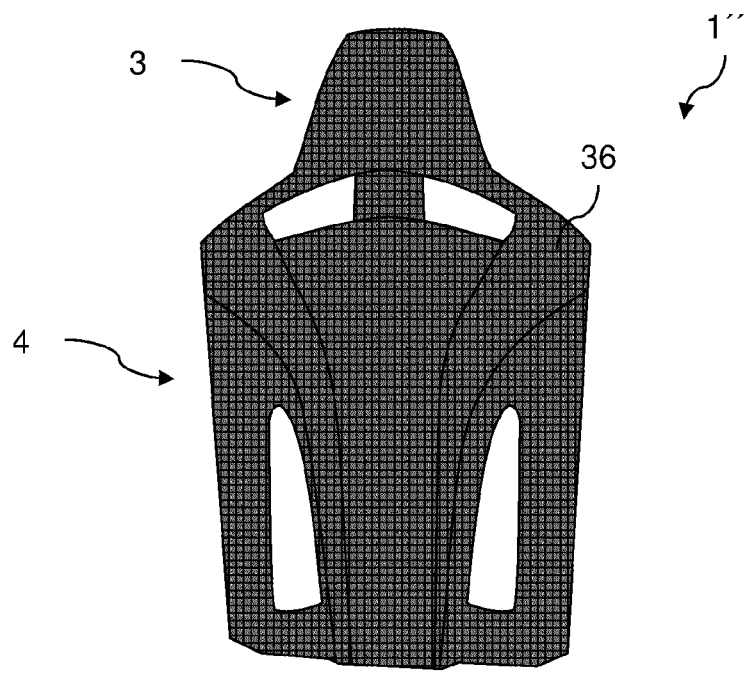
FIG. 11 shows a view of a further illustrative unlit visible component.
Figure 12:
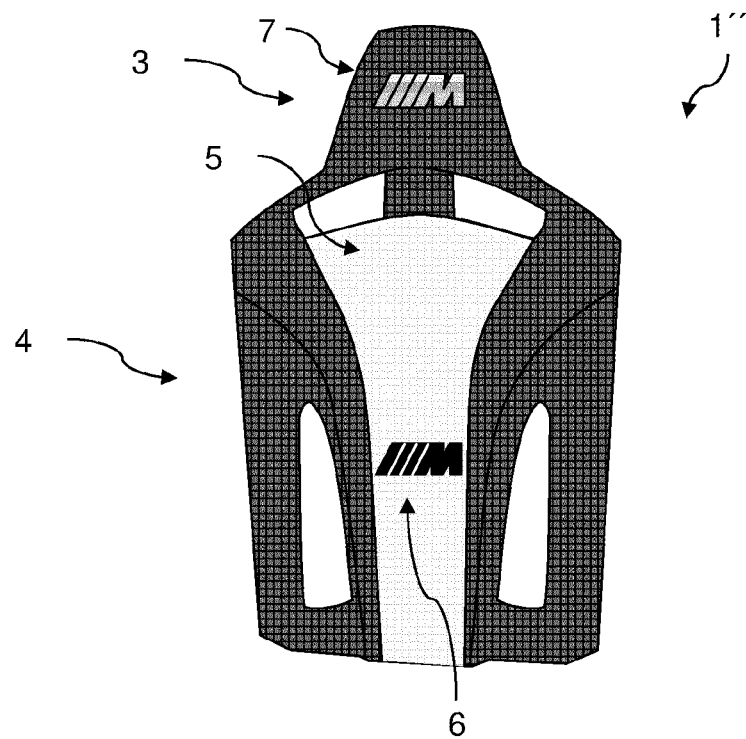
FIG. 12 shows the visible component from FIG. 11 in the lit state.

FIG. 7 to 10 show section views of further illustrative visible components 1D to 1G. These visible components 1D to 1G differ from the visible components shown in FIGS. 1 to 4 merely in that rather than the opaque visible layer 35, a metallized glass fiber layer 36 is provided in the main body 10. FIGS. 11 and 12 likewise show a further visible component 1", which is similar in its construction to the visible component 1' described for FIGS. 5 and 6. The sole difference here too is that, rather than the opaque visible layer 35, a metallized glass fiber layer 36 is incorporated. Identical reference numerals denote identical features; in this respect, the description relating to FIGS. 1 to 6 is correspondingly also applicable to FIGS. 7 to 12. The visible component 1" has a construction as apparent from FIG. 9 in the region of the headrest 3, and a construction as shown in FIG. 8 in the region of the backrest 4.

If the light source 40 is deactivated, the visible component 1" looks like a conventional component in a fiber composite look. The metallized glass fiber layer 36 is visible through the plastic matrix. With the light source 40 activated, the visible component 1' is lit from the inside.

The use of a metallized glass fiber layer 36 rather than an opaque visible layer 35 results in a change in effect in the lit state. While the light from the light source 40 in FIG. 6 can pass only through the interspaces in the opaque visible layer 35, a portion of the light from the light source 40 also passes through the metallized glass fiber layer 36 in the case of the visible component 1" in FIG. 12. The metallization or vapor-deposited metal is so thin that the glass fiber layer 36 is translucent to the light. The outward effect is thus that, in the lit state, the structure of the visible layer is less apparent, and the light effect and color effect or the shape of the masked region is more clearly apparent that in the case of the visible component with an opaque visible layer.

LIST OF REFERENCE NUMERALS 1, 1', 1", 1A-1G visible component
2 visible side 3 headrest
4 back rest
5 inner region
6 brand label
10 main body
20 plastic matrix
30 fiber reinforcement
31-34 structure layers
35 opaque visible layer
36 metallized glass fiber layer
40 light source
50 masking layer
60, 60A color filter layer

The invention claimed is:

1. A visible component for a motor vehicle, the visible component comprising:
a main body in a form of a fiber-reinforced plastic component having a multilayer fiber reinforcement incorporated into an at least largely transparent plastic matrix, wherein:
the multilayer fiber reinforcement is formed by an opaque visible layer and largely transparent structure layers,
the visible layer is formed by first fibers that are incorporated into the plastic matrix,
the structure layers are formed by second fibers that are incorporated into the plastic matrix,
the visible layer is configured such that when the visible layer is backlit, light passes through interspaces between the first fibers of the visible layer, and
the interspaces are filled with the plastic matrix.

2. The visible component according to claim 1, wherein the visible layer is formed by a carbon fiber layer, an aramid fiber layer or a metal fiber layer.

3. A visible component for a motor vehicle having:
a main body in a form of a fiber-reinforced plastic component having a multilayer fiber reinforcement incorporated into an at least largely transparent plastic matrix, wherein:
the multilayer fiber reinforcement is formed by a visible layer in a form of a metallic glass fiber layer and largely transparent structure layers,
the visible layer is formed by first fibers that are incorporated into the plastic matrix,
the structure layers are formed by second fibers that are incorporated into the plastic matrix,
the visible layer is configured such that when the visible layer is backlit, light passes through interspaces between the first fibers of the visible layer, and
the interspaces are filled with the plastic matrix.

4. The visible component according to claim 1, wherein:
the structure layers take a form of glass fiber layers.

5. The visible component according to claim 3, wherein:
the structure layers take a form of glass fiber layers.

6. The visible component according to claim 1, wherein:
the visible layer is formed by a weave, scrim, knit, nonwoven or braid.

7. The visible component according to claim 3, wherein:
the visible layer is formed by a weave, scrim, knit, nonwoven or braid.

8. The visible component according to claim 1, wherein:
the plastic matrix is a thermoset plastic matrix.

9. The visible component according to claim 3, wherein:
the plastic matrix is a thermoset plastic matrix.

10. The visible component according to claim 1, further comprising:
a light source disposed on a side of the main body remote from the visible layer,
wherein light emitted from the light source shines through the main body in the direction of the visible layer.

11. The visible component according to claim 3, further comprising:
a light source disposed on a side of the main body remote from the visible layer,
wherein light emitted from the light source shines through the main body in the direction of the visible layer.

12. The visible component according to claim 1, further comprising at least one color filter layer disposed on the main body.

13. The visible component according to claim 12, wherein:
the at least one color filter layer is formed by a paint layer or by a sticker.

14. The visible component according to claim 3, further comprising at least one color filter layer disposed on the main body.

15. The visible component according to claim 1, further comprising a masking layer disposed on the main body.

16. The visible component according to claim 15, wherein:
the masking layer is formed by a paint layer or by a sticker.

17. The visible component according to claim 3, further comprising a masking layer disposed on the main body.

18. The visible component according to claim 1, wherein the visible component is an interior component of a motor vehicle.

* * * * *